(12) United States Patent
Chuang

(10) Patent No.: US 6,435,533 B1
(45) Date of Patent: Aug. 20, 2002

(54) BICYCLE FRONT MUDGUARD

(76) Inventor: Louis Chuang, P.O. Box 63-247, Taichung (TW)

( * ) Notice: Subject to any disclaimer, the term of this patent is extended or adjusted under 35 U.S.C. 154(b) by 120 days.

(21) Appl. No.: 09/611,252

(22) Filed: Jul. 6, 2000

(51) Int. Cl.[7] .................... B62D 25/18; F16B 7/00
(52) U.S. Cl. ................ 280/152.1; 280/152.3; 403/370
(58) Field of Search .................. 280/152.1, 152.3, 280/152.2, 154, 848, 852, 160.1; D12/114; 403/367, 368, 370, 373, 374.1, 374.2, 374.3, 329, 326, 282

(56) References Cited

U.S. PATENT DOCUMENTS

| | | | | |
|---|---|---|---|---|
| 598,312 A | * | 2/1898 | Carpenter | 280/152.1 |
| 2,135,257 A | * | 11/1938 | Manton | 280/152.1 |
| D118,828 S | * | 2/1940 | Morgan | 280/152.1 |
| 2,932,270 A | * | 4/1960 | Wintermantel | 280/152.1 |
| 2,999,706 A | * | 9/1961 | Wilcox | 403/307 |
| 4,274,301 A | * | 6/1981 | Katayama | 403/307 |
| D305,113 S | * | 12/1989 | Paduganan | 403/307 |
| 5,419,650 A | * | 5/1995 | Hoshino | 403/307 |
| 5,536,104 A | * | 7/1996 | Chen | 403/307 |
| 5,605,075 A | * | 2/1997 | Chi | 403/307 |
| 5,680,798 A | * | 10/1997 | Luen | 403/307 |
| 5,810,380 A | * | 9/1998 | Lin | 403/307 |
| 6,331,011 B1 | * | 12/2001 | Feldmann et al. | 280/152.1 |

* cited by examiner

*Primary Examiner*—Brian L. Johnson
*Assistant Examiner*—Jeffrey J. Restifo
(74) *Attorney, Agent, or Firm*—Alan Kamrath; Rider, Bennett, Egan & Arundel, LLP

(57) ABSTRACT

A bicycle front mudguard includes a first mudguard section and a second mudguard section. A mounting member includes a first end to which the first mudguard section is attached and a second end to which the second mudguard section is attached. An attachment device is provided for attaching the mounting member to a bicycle head tube.

17 Claims, 5 Drawing Sheets

BICYCLE FRONT MUDGUARD

BACKGROUND OF THE INVENTION

1. Field of the Invention

The present invention relates to a bicycle front mudguard.

2. Description of the Related Art

A typical bicycle generally includes front and rear mudguards to prevent the cyclist from being splashed with mud during cycling. Nevertheless, a mudguard with specific dimension cannot be applied to all kinds of bicycles. In addition, attachment of the mudguards to the bicycle is troublesome, as one has to detach the front/rear brakes before attachment of the mudguards and reattach the front/rear brakes after attachment of the mudguards.

SUMMARY OF THE INVENTION

It is an object of the present invention to provide an improved bicycle front mudguard that can be attached to a bicycle head tube without the need of detaching the front brake.

It is another object of the present invention to provide an improved bicycle front mudguard that can be attached to all kinds of bicycle head tubes with different inner diameters.

In an embodiment of the invention, a bicycle front mudguard comprises a mudguard including a first mudguard section and a second mudguard section. A mounting member includes a first end to which the first mudguard section is attached and a second end to which the second mudguard section is attached. An attachment device is provided for attaching the mounting member to a bicycle head tube.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
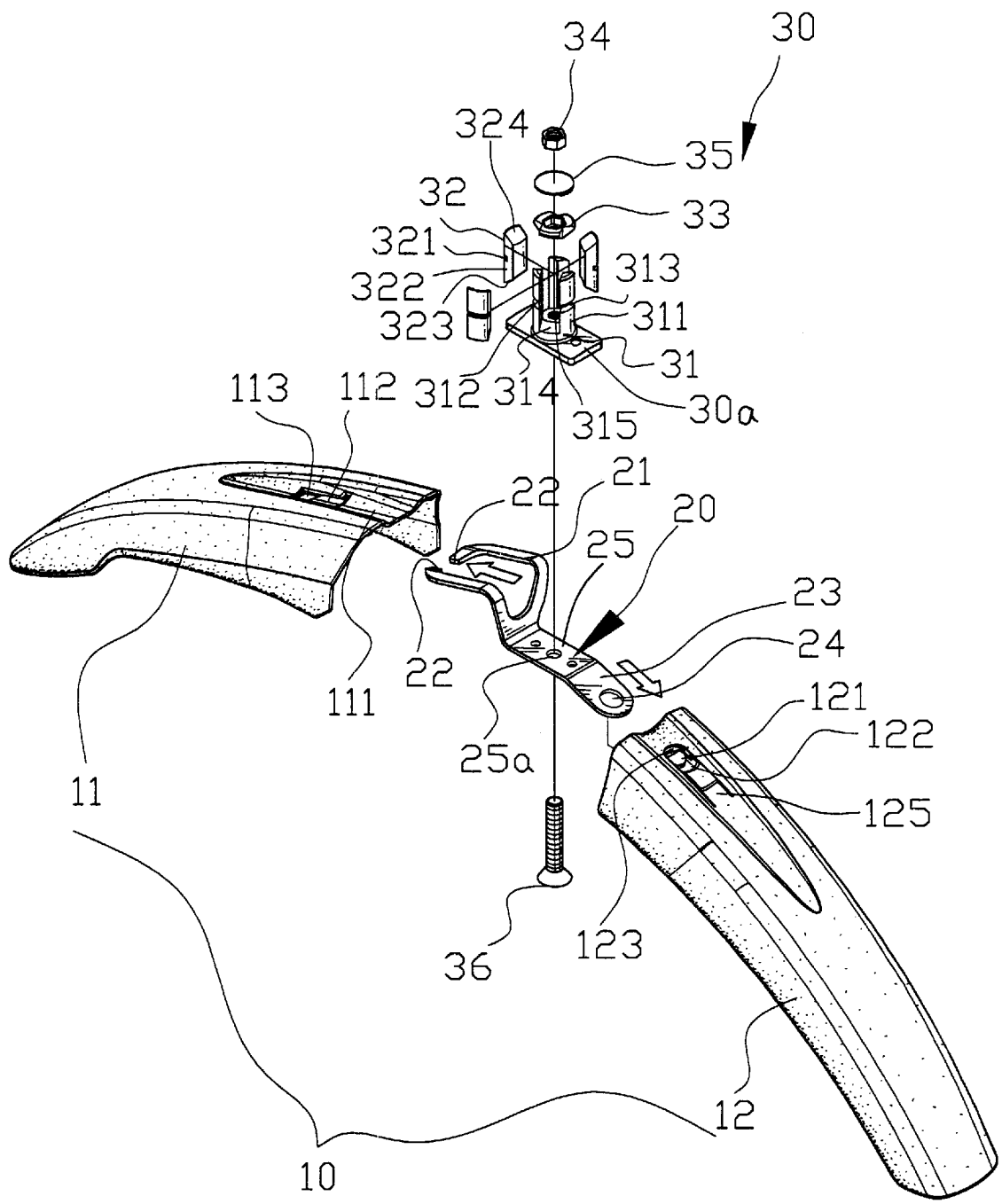
FIG. 1 is an exploded perspective view of a bicycle front mudguard in accordance with the present invention.
Figure 2:
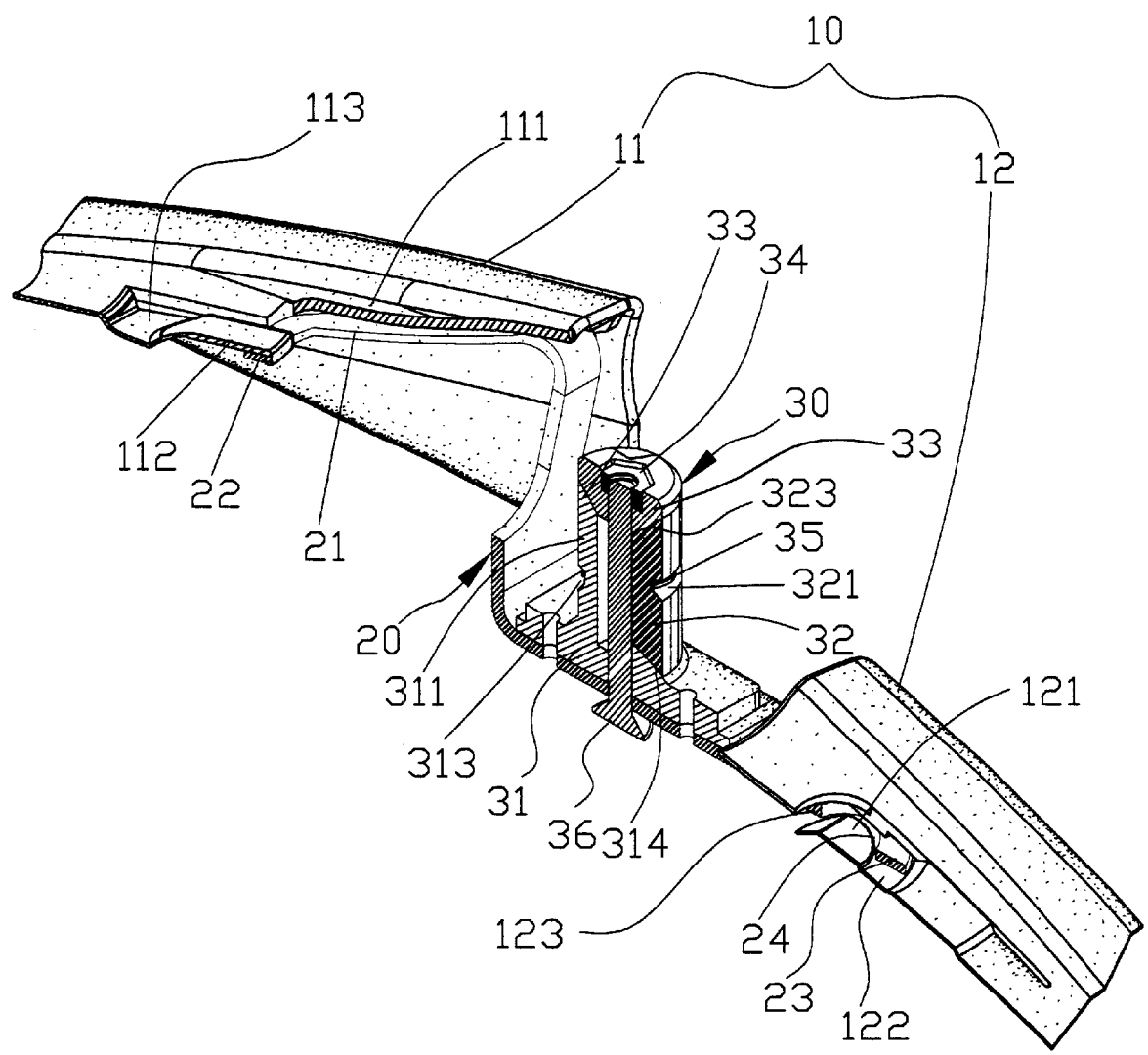
FIG. 2 is a perspective view, partly sectioned, of the bicycle front mudguard in accordance with the present invention.

Referring to FIGS. 1 and 2, a bicycle front mudguard in accordance with the present invention generally includes a mudguard 10 consisting of a first mudguard section 11 and a second mudguard section 12, a mounting means 20 to which the mudguard 10 is attached, and means 30 for attaching the mounting means 20 to a bicycle head tube 40.

The mounting means 20 includes a substantially U-shape first end 21 with two stops 22 and a second end 23 having a hole 24. The mounting means 20 further includes an intermediate section 25 having an engaging hole 25a, which will be described later. The first mudguard section 11 includes an end having a track 111. The track 111 has a block 112 and a space 113 around the block 112. The track 111 of the first mudguard section 11 is engaged with the first end 21 of the mounting means 20, wherein the stops 22 of the mounting means 20 are moved into the space 113 such that disengagement of the first mudguard section 11 from the mounting means 20 is prevented.

The second mudguard section 12 includes an end having a resilient tab 125 formed by cutting a substantially U-shape slit 123. The resilient tab 125 includes a protrusion 121 formed on a distal end thereof and a recessed area 122 around the protrusion 121. The second mudguard section 12 is engaged with the second end 23 of the mounting means 20, wherein the slit 123 guides the second end 23 of the mounting means 20 until the protrusion 121 is engaged with the hole 24 of the second end 23 of the mounting means 20 via an underside of the hole 24. A periphery defining the hole 24 of the mounting means 20 is snugly received in the recessed area 122 of the second mudguard section 12. Thus, engagement between the second mudguard section 12 and the mounting means 20 is accomplished.

The attachment means 30 is provided to attach the mounting means 20 to the bicycle head tube 40 before mounting the mudguard sections 11 and 12 to the mounting means 20. In this embodiment, the attachment means 30 includes a base plate 30a having a stub 31 formed on a side thereof. A screw hole 315 is defined in the stub 31 and extends through the base plate 30a. The stub 31 includes a plurality of (e.g., three) annularly spaced guide posts 311 extended upward from an outer periphery thereof, each guide post 311 having two lateral sides 312 that taper inward. The outer periphery of the stub 31 further includes a plurality of (e.g., three) annularly spaced beveled guide faces 314, each guide face 314 being disposed between two adjacent guide posts 311 and inclined upward. Each guide post 311 has a groove section 313 in an outer face thereof.

The attachment means 30 is provided to attach the mounting means 20 to the bicycle head tube 40 before mounting the mudguard sections 11 and 12 to the mounting means 20. In this embodiment, the attachment means 30 includes a base plate 30a having a stub 31 formed on a side thereof. A screw hole 315 is defined in the stub 31 and extends through the base plate 30a. The stub 31 includes a plurality of (e.g., three) annularly spaced guide posts 311 extended upward from an outer periphery thereof, each guide post 311 having two lateral sides 312 that taper inward. The outer periphery of the stub 31 further includes a plurality of (e.g., three) annularly spaced beveled guide face 314, each guide face 314 being disposed between two adjacent guide posts 311 and inclined upward. Each guide post 311 has a groove section 313 in an outer face thereof.

Mounted between each two adjacent guide posts 311 is an engaging block 32 that has two lateral sides 322 that are complimentary to the lateral sides of the guide posts 311. The engaging block 32 further includes a beveled lower side 323 and a beveled upper side 324. The beveled lower side 323 is constructed to slide along an associated beveled guide face 314 of the stub 31. Each engaging block 32 further includes a groove section 321 in an outer face thereof. As illustrated in FIGS. 1 and 2, a fastener (e.g., a screw 36) is extended through the hole 25a of the mounting means 20 and the screw hole 315. An actuating block 33 is mounted around the screw 36 to rotate therewith. The actuating block 33 includes an outer periphery that is configured to bear against the beveled upper sides 324 of the engaging blocks 32 such that the engaging blocks 32 are moved inward or outward in response to clockwise or counterclockwise rotation of the screw 36. An elastic ring 35 is mounted in a substantially annular groove that is formed by the groove sections 313 of the guide posts 311 and the groove sections 321 of the engaging blocks 32 to prevent disengagement of the engaging blocks 32. A nut 34 is mounted to a distal end of the screw 36 to prevent disengagement of the actuating block 33.

Figure 3:
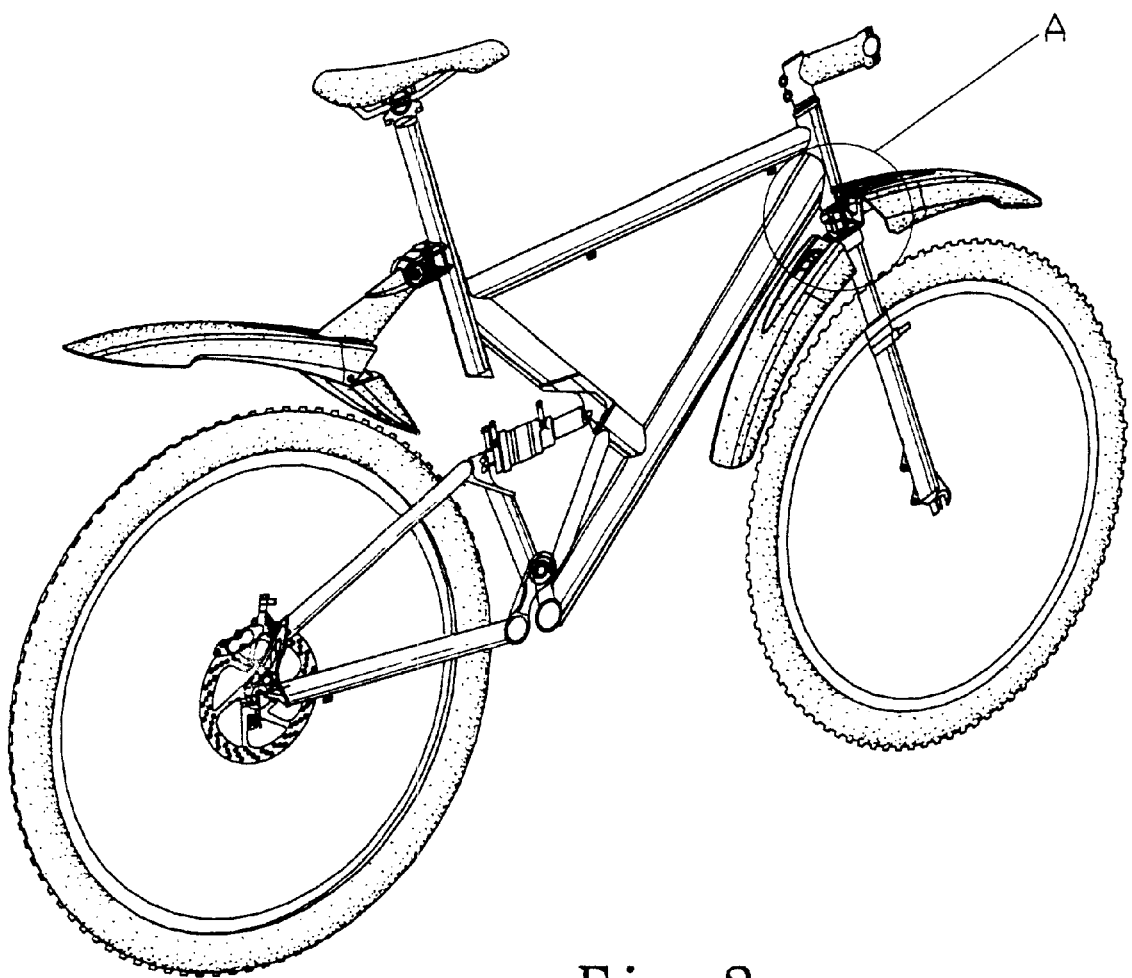
FIG. 3 is a schematic perspective view illustrating application of the bicycle front mudguard in accordance with the present invention.
Figure 4:
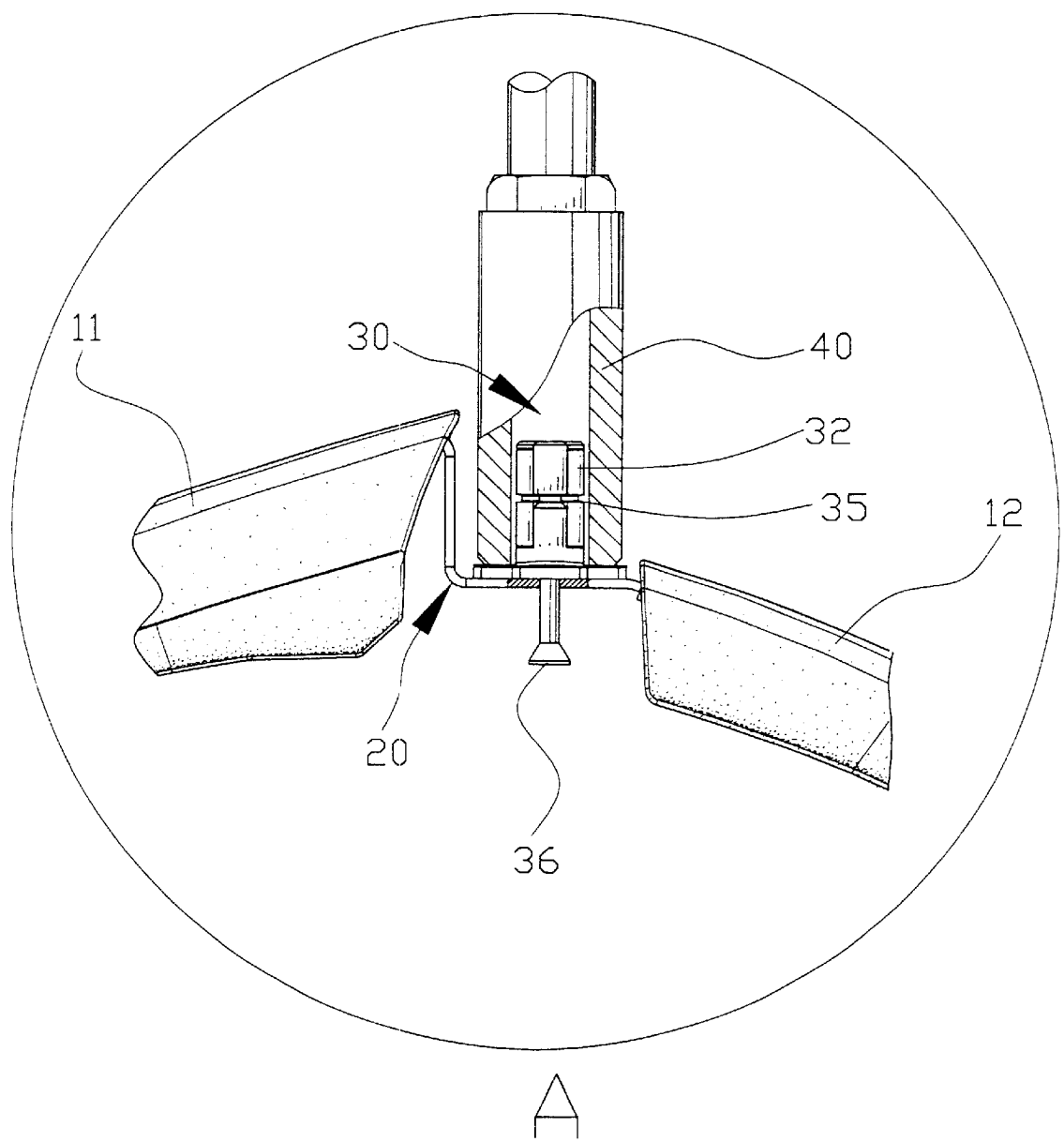
FIG. 4 is an enlarged view of a circle A in FIG. 3.
Figure 5:
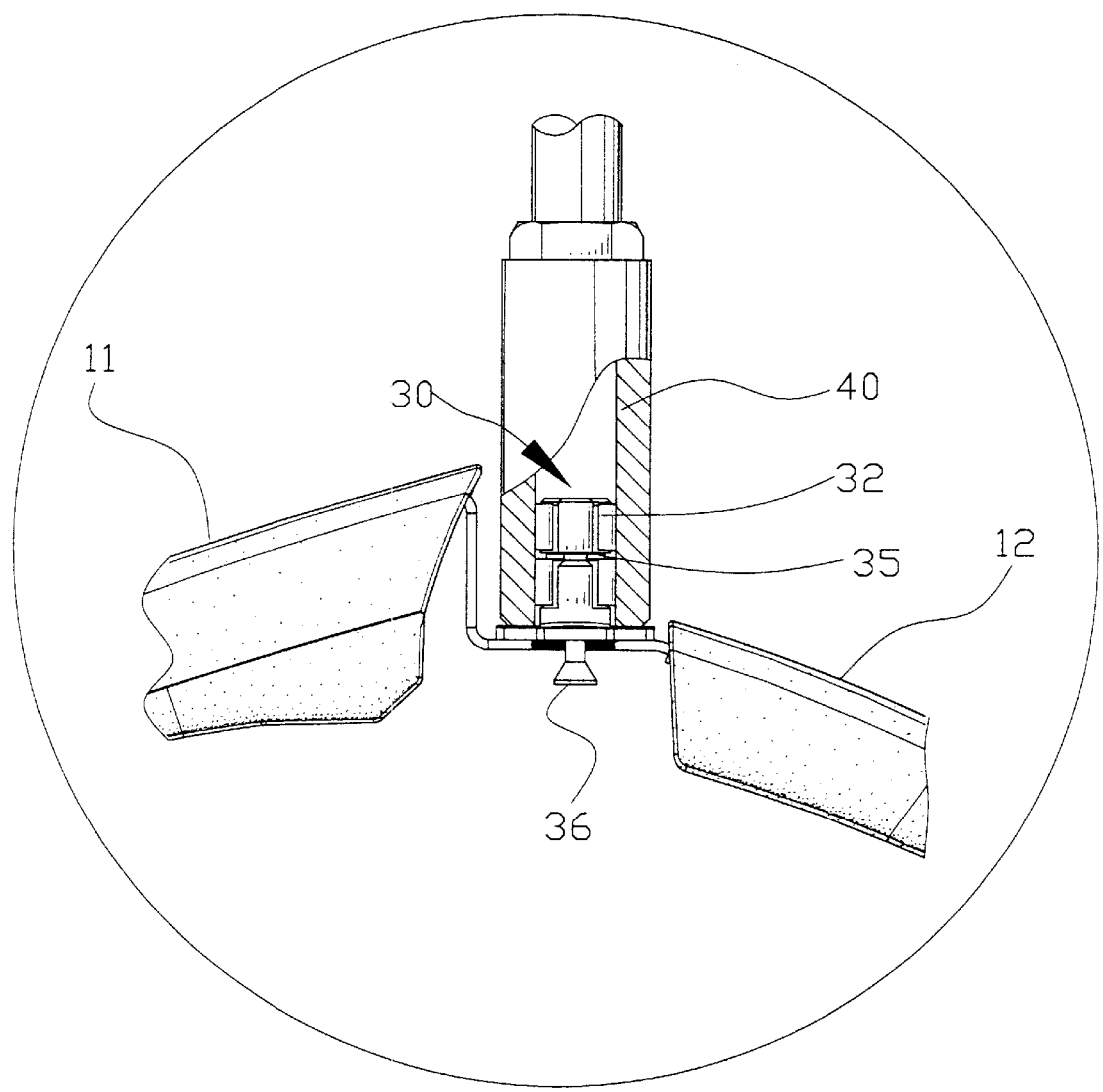
FIG. 5 is a view similar to FIG. 4, illustrating attachment of the bicycle front mudguard.

Referring to FIGS. 3 and 4, when mounting the front mudguard to the bicycle head tube 40, the upper part of the attachment means 30 is inserted into the head tube 40 from an underside of the head tube 40. The screw 36 is then rotated, e.g., counterclockwise such that the actuating block 33 is moved downward. The engaging blocks 32 are thus moved outward to be in frictional contact with an inner periphery (not labeled) of the head tube 40, best shown in FIG. 5. Thus, attachment of the mounting means 20 to the head tube 40 is easily accomplished by means of turning the screw 36. Next, the first and second mudguard sections 11 and 12 are attached to two ends of the mounting means 20 as mentioned above.

According to the above description, it is appreciated that the front mudguard in accordance with the present invention can be easily and quickly attached to a bicycle head tube of any type and dimension. No additional means or tools are required.

Although the invention has been explained in relation to its preferred embodiment, it is to be understood that many other possible modifications and variations can be made without departing from the scope of the invention as hereinafter claimed.

What is claimed is:

1. A bicycle front mudguard comprising, in combination: a mudguard; and a mounting member including a substantially U-shape end having two stops, and wherein the mudguard includes a first detachable mudguard section and a second detectable mudguard section, with the first mudguard section including a track for engaging with the U-shape end of the mounting member, with the track including a block for engaging with the stops of the mounting member to thereby prevent disengagement of the first mudguard section from the mounting member, with the mounting member being attachable to a head tube of a bicycle.

2. The bicycle front mudguard as claimed in claim 1, wherein the mounting member includes a second end having a hole, and wherein the second mudguard section includes a resilient tab formed by a substantially U-shape slit, with the resilient tab including a protrusion on a distal end thereof, with the second end of the mounting means being inserted into the slit such that the protrusion is engaged with the hole.

3. The bicycle front mudguard as claimed in claim 1, wherein the mounting member is attachable to the head tube by an attachment device including:
   means for frictionally engaging with an inner periphery of the head tube; and
   means for adjusting radial position of the frictionally engaging means relative to the head tube.

4. The bicycle front mudguard as claimed in claim 1, wherein the mounting member is attachable to the head tube by an attachment device including:
   a base plate having a stub formed on a side thereof, a screw hole being defined in the stub and extended through the base plate, with the stub including a plurality of annularly spaced guide posts extending upward from an outer periphery thereof, with each said guide post having two lateral sides that taper inward, with the outer periphery of the stub further including a plurality of annularly spaced beveled guide faces, with each said guide face being disposed between two adjacent said guide posts and inclined upward, with each said guide post having a first groove section in an outer face thereof;
   a plurality of engaging blocks each of which is mounted between two adjacent said guide posts, with each said engaging block having two lateral sides that are complimentary to the lateral sides of the guide posts, with each said engaging block further including a beveled lower side and a beveled upper side, with the beveled lower side being constructed to slide along an associated said beveled guide face of the stub, with each said engaging block further including a second groove section in an outer face thereof, with the first groove sections of the guide posts and the second groove sections of the engaging blocks together defining a substantially annular groove;
   a fastener extended through the mounting member and the screw hole;
   an actuating block mounted around the fastener to rotate therewith, with the actuating block including an outer periphery that is configured to bear against the beveled upper sides of the engaging blocks such that the engaging blocks are moved inward or outward in response to clockwise or counterclockwise rotation of the fastener; and
   an elastic ring mounted in the annular groove to prevent disengagement of the engaging blocks.

5. The bicycle front mudguard as claimed in claim 4, further comprising a nut mounted to a distal end of the fastener to prevent disengagement of the actuating block.

6. A bicycle front mudguard comprising, in combination: a mudguard; and a mounting member including an end having a hole, and wherein the mudguard includes a first detachable mudguard section and a second detachable mudguard section, with the second mudguard section including a resilient tab formed by a substantially U-shape slit, with the resilient tab including a protrusion on a distal end thereof, with the second end of the mounting means being inserted into the slit such that the protrusion is engaged with the hole, with the mounting member being attachable to a head tube of a bicycle.

7. The bicycle front mudguard as claimed in claim 6, wherein the mounting member is attachable to the head tube by an attachment device including:
   means for frictionally engaging with an inner periphery of the head tube; and
   means for adjusting radial position of the frictionally engaging means relative to the head tube.

8. The bicycle front mudguard as claimed in claim 6, wherein the mounting member is attachable to the head tube by an attachment device including:
   a base plate having a stub formed on a side thereof, a screw hole being defined in the stub and extended through the base plate, with the stub including a plurality of annularly spaced guide posts extending upward from an outer periphery thereof, with each said guide post having two lateral sides that taper inward, with the outer periphery of the stub further including a plurality of annularly spaced beveled guide faces, with each said guide face being disposed between two adjacent said guide posts and inclined upward, with each said guide post having a first groove section in an outer face thereof;
   a plurality of engaging blocks each of which is mounted between two adjacent said guide posts, with each said engaging block having two lateral sides that are complimentary to the lateral sides of the guide posts, with each said engaging block further including a beveled lower side and a beveled upper side, with the beveled lower side being constructed to slide along an associated said beveled guide face of the stub, with each said engaging block further including a second groove section in an outer face thereof, with the first groove sections of the guide posts and the second groove sections of the engaging blocks together defining a substantially annular groove;

a fastener extended through the mounting member and the screw hole;

an actuating block mounted around the fastener to rotate therewith, with the actuating block including an outer periphery that is configured to bear against the beveled upper sides of the engaging blocks such that the engaging blocks are moved inward or outward in response to clockwise or counterclockwise rotation of the fastener; and an elastic ring mounted in the annular groove to prevent disengagement of the engaging blocks.

9. The bicycle front mudguard as claimed in claim 8, further comprising a nut mounted to a distal end of the fastener to prevent disengagement of the actuating block.

10. A device for attaching a member to a bicycle head tube comprising, in combination:

a base plate having a stub formed on a side thereof, a screw hole being defined in the stub and extended through the base plate, with the stub including a plurality of annularly spaced guide posts extending upward from an outer periphery thereof, with each said guide post having two lateral sides that taper inward, with the outer periphery of the stub further including a plurality of annularly spaced beveled guide faces, with each said guide face being disposed between two adjacent said guide posts and inclined upward, with each said guide post having a first groove section in an outer face thereof;

a plurality of engaging blocks each of which is mounted between two adjacent said guide posts, with each said engaging block having two lateral sides that are complimentary to the lateral sides of the guide posts, with each said engaging block further including a beveled lower side and a beveled upper side, with the beveled lower side being constructed to slide along an associated said beveled guide face of the stub, with each said engaging block further including a second groove section in an outer face thereof, with the first groove sections of the guide posts and the second groove sections of the engaging blocks together defining a substantially annular groove;

a fastener extended through the member and the screw hole;

an actuating block mounted around the fastener to rotate therewith, with the actuating block including an outer periphery that is configured to bear against the beveled upper sides of the engaging blocks such that the engaging blocks are moved inward or outward in response to clockwise or counterclockwise rotation of the fastener; and an elastic ring mounted in the annular groove to prevent disengagement of the engaging blocks.

11. The attaching device as claimed in claim 10, further comprising, in combination: a nut mounted to a distal end of the fastener to prevent disengagement of the actuating block.

12. A bicycle front mudguard comprising:

a mudguard including a first detachable mudguard section and a second detachable mudguard section;

a mounting means including a first end to which the first mudguard section is attached and a second end to which the second mudguard section is attached, wherein the first end of the mounting means is substantially U-shape and has two stops, and wherein the first mudguard section includes a track for engaging with the first end of the mounting means, with the track including a block for engaging with the stops of the mounting means to thereby prevent disengagement of the first mudguard section from the mounting means; and an attachment means for attaching the mounting means to a bicycle head tube.

13. The bicycle front mudguard as claimed in claim 12, wherein the second end of the mounting means includes a hole, and with the second mudguard section including a resilient tab formed by a substantially U-shape slit, with the resilient tab including a protrusion on a distal end thereof, with the second end of the mounting means being inserted into the slit such that the protrusion is engaged with the hole.

14. The bicycle front mudguard as claimed in claim 13, wherein the attachment means includes:

means for frictionally engaging with an inner periphery of the head tube; and means for adjusting radial position of the frictionally engaging means relative to the head tube.

15. The bicycle front mudguard as claimed in claim 12, wherein the attachment means includes:

a base plate having a stub formed on a side thereof, a screw hole being defined in the stub and extended through the base plate, with the stub including a plurality of annularly spaced guide posts extending upward from an outer periphery thereof, with each said guide post having two lateral sides that taper inward, with the outer periphery of the stub further including a plurality of annularly spaced beveled guide faces, with each said guide face being disposed between two adjacent said guide posts and inclined upward, with each said guide post having a first groove section in an outer face thereof;

a plurality of engaging blocks each of which is mounted between two adjacent said guide posts, with each said engaging block having two lateral sides that are complimentary to the lateral sides of the guide posts, with each said engaging block further including a beveled lower side and a beveled upper side, with the beveled lower side being constructed to slide along an associated said beveled guide face of the stub, with each said engaging block further including a second groove section in an outer face thereof, with the first groove sections of the guide posts and the second groove sections of the engaging blocks together defining a substantially annular groove;

a fastener extended through the mounting means and the screw hole;

an actuating block mounted around the fastener to rotate therewith, with the actuating block including an outer periphery that is configured to bear against the beveled upper sides of the engaging blocks such that the engaging blocks are moved inward or outward in response to clockwise or counterclockwise rotation of the fastener; and an elastic ring mounted in the annular groove to prevent disengagement of the engaging blocks.

16. The bicycle front mudguard as claimed in claim 15, further comprising a nut mounted to a distal end of the fastener to prevent disengagement of the actuating block.

17. The bicycle front mudguard as claimed in claim 12, wherein the attachment means includes:

means for frictionally engaging with an inner periphery of the head tube; and means for adjusting radial position of the frictionally engaging means relative to the head tube.

* * * * *